United States Patent
Kim et al.

(10) Patent No.: US 11,273,747 B1
(45) Date of Patent: Mar. 15, 2022

(54) MULTI-POSITIONAL TRAY DEPLOYABLE FROM INSTRUMENT PANEL

(71) Applicant: Ford Global Technologies, LLC, Dearborn, MI (US)

(72) Inventors: Yoon Kim, Northville, MI (US); Alan Perelli, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/086,790

(22) Filed: Nov. 2, 2020

(51) Int. Cl.
*B60N 3/00* (2006.01)

(52) U.S. Cl.
CPC .................. *B60N 3/002* (2013.01)

(58) Field of Classification Search
CPC ........ B60N 3/002; B60N 3/004; A47B 31/06; A47C 7/624; A47C 7/70; A47C 7/68
USPC ...................... 108/44, 45; 297/145
See application file for complete search history.

(56) References Cited

U.S. PATENT DOCUMENTS

| | | | | |
|---|---|---|---|---|
| 6,032,587 A * | 3/2000 | Salenbauch | ............ | B60N 3/002 108/44 |
| 6,347,590 B1 * | 2/2002 | D'Annunzio | .......... | B60N 3/002 108/25 |
| 6,386,413 B1 * | 5/2002 | Twyford | ............. | B60R 11/0252 108/138 |
| 7,798,072 B2 * | 9/2010 | Becker | ................... | A47C 7/624 108/42 |
| 7,830,460 B2 * | 11/2010 | Ido | ......... | B60K 35/00 348/837 |
| 8,336,956 B2 * | 12/2012 | Westerink | ............. | B60N 3/001 297/145 |
| 8,596,206 B2 * | 12/2013 | Legeay | .............. | B64D 11/0604 108/50.11 |
| 9,102,410 B2 * | 8/2015 | Frost | ....................... | B60N 3/002 |
| 9,428,118 B1 * | 8/2016 | Rawlinson | ............. | B60N 3/002 |
| 9,783,303 B2 * | 10/2017 | Gagnon | ................. | B64D 11/06 |
| 9,849,819 B2 | 12/2017 | Farooq et al. | | |
| 9,896,011 B2 | 2/2018 | Kong et al. | | |
| 10,457,170 B2 * | 10/2019 | Line | ....................... | B60N 3/101 |
| 10,674,829 B2 * | 6/2020 | Pozzi | ..................... | B61D 37/00 |
| 10,744,950 B1 * | 8/2020 | Meyer | ....................... | B60R 7/04 |
| 10,752,132 B2 | 8/2020 | Fitzpatrick et al. | | |
| 10,906,444 B2 * | 2/2021 | Line | ........................ | B60N 2/79 |
| 2005/0018392 A1 * | 1/2005 | Strohmeier | .......... | G06F 1/1632 361/679.55 |
| 2008/0190330 A1 * | 8/2008 | Bart | ....................... | A47B 31/06 108/44 |
| 2010/0319588 A1 * | 12/2010 | Hanna | ................ | B64D 11/0638 108/20 |

(Continued)

FOREIGN PATENT DOCUMENTS

| | | |
|---|---|---|
| CN | 108621967 A | 10/2018 |
| DE | 202011106677 U1 | 11/2011 |

*Primary Examiner* — Jose V Chen
(74) *Attorney, Agent, or Firm* — Vichit Chea; Carlson, Gaskey & Olds, P.C.

(57) ABSTRACT

An apparatus and method, according to an exemplary aspect of the present disclosure includes, among other things, a table that is moveable between a stowed position and a deployed position. The table extends behind an external surface of an instrument panel such that the table is stored within an instrument panel structure when in the stowed position. When in the deployed position, the table is moveable between a plurality of use positions between a driver and a passenger.

24 Claims, 7 Drawing Sheets

(56) References Cited

U.S. PATENT DOCUMENTS

| | | | |
|---|---|---|---|
| 2011/0048289 A1* | 3/2011 | Pietila | B60N 3/002 |
| | | | 108/44 |
| 2012/0306241 A1* | 12/2012 | Winter | B60N 3/002 |
| | | | 297/163 |
| 2015/0321592 A1* | 11/2015 | De Morais | A47B 5/006 |
| | | | 297/147 |
| 2020/0055436 A1* | 2/2020 | Garcia Sanchez | B60N 2/91 |
| 2021/0039559 A1* | 2/2021 | Santillan Gutierrez | |
| | | | B60N 2/206 |

* cited by examiner

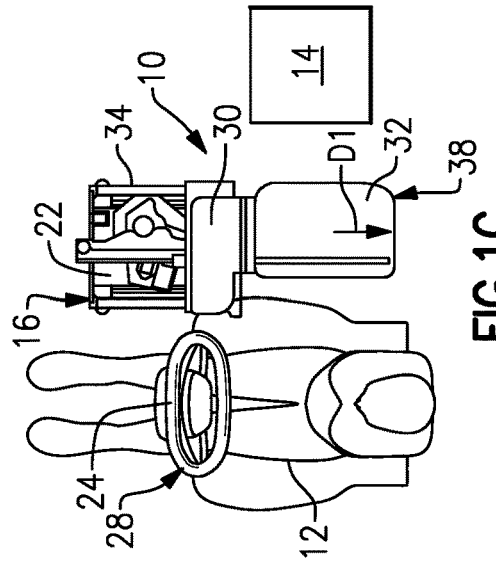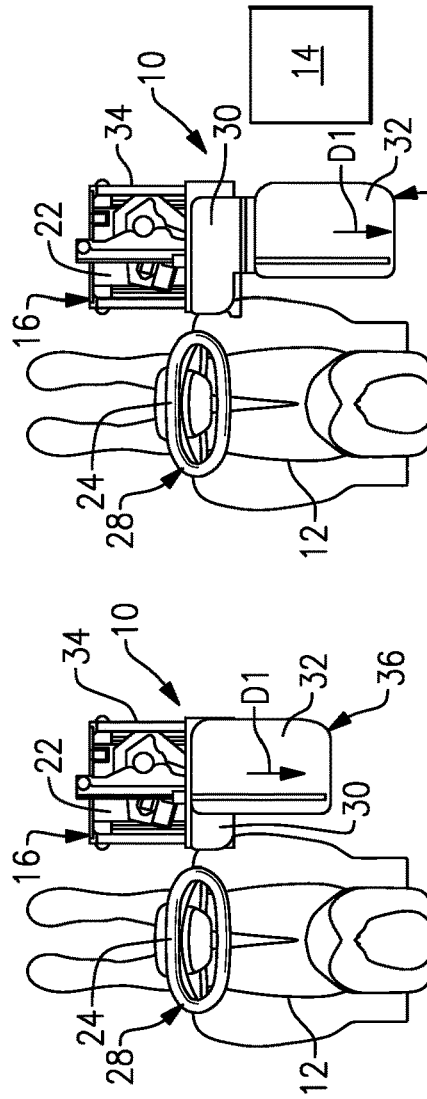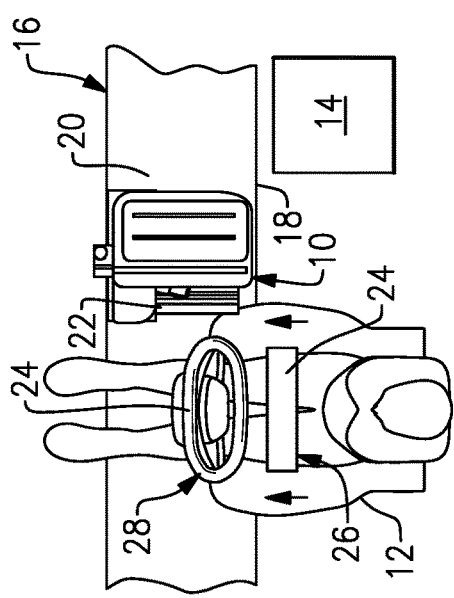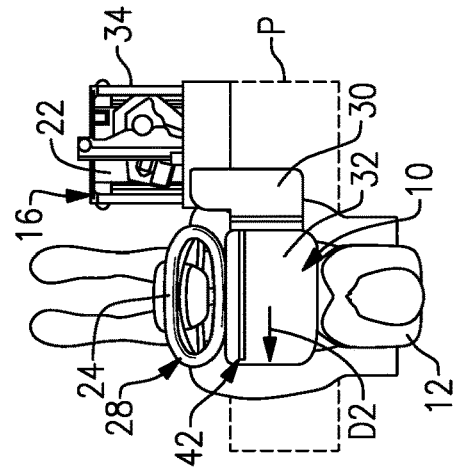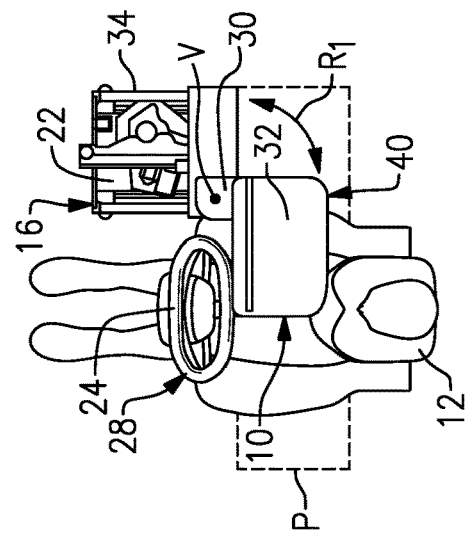

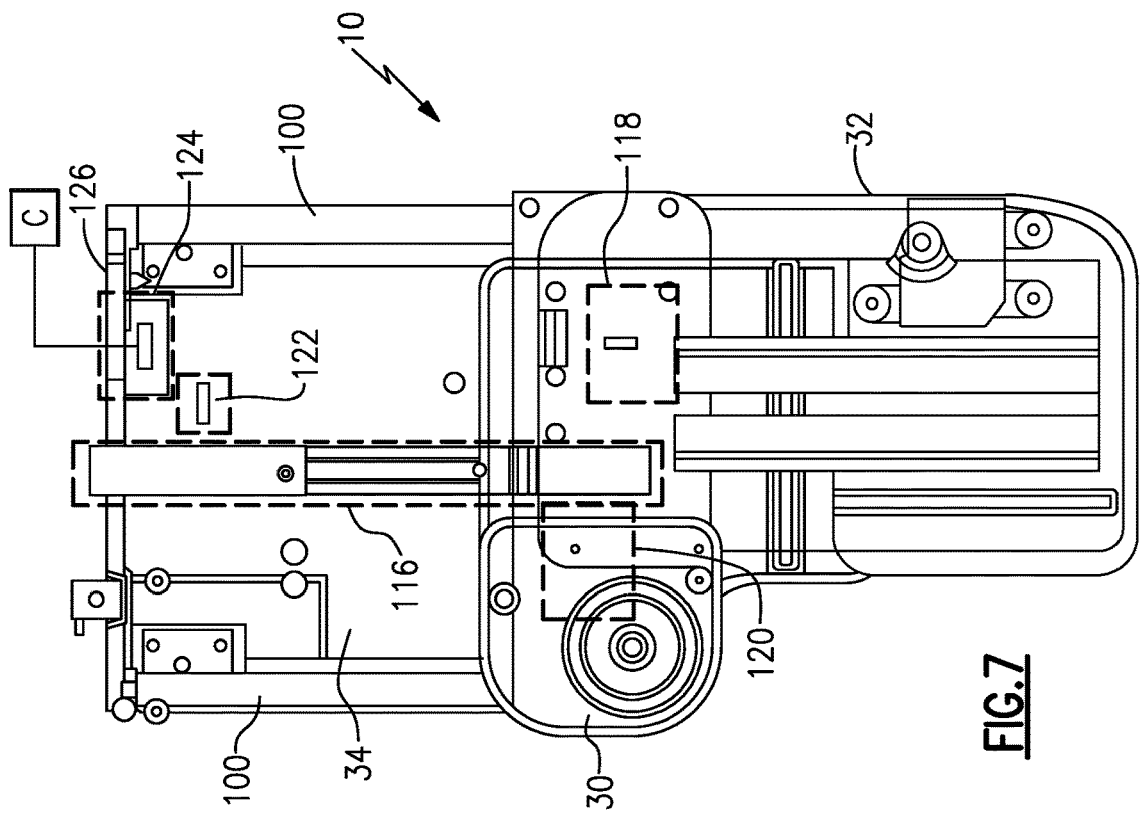
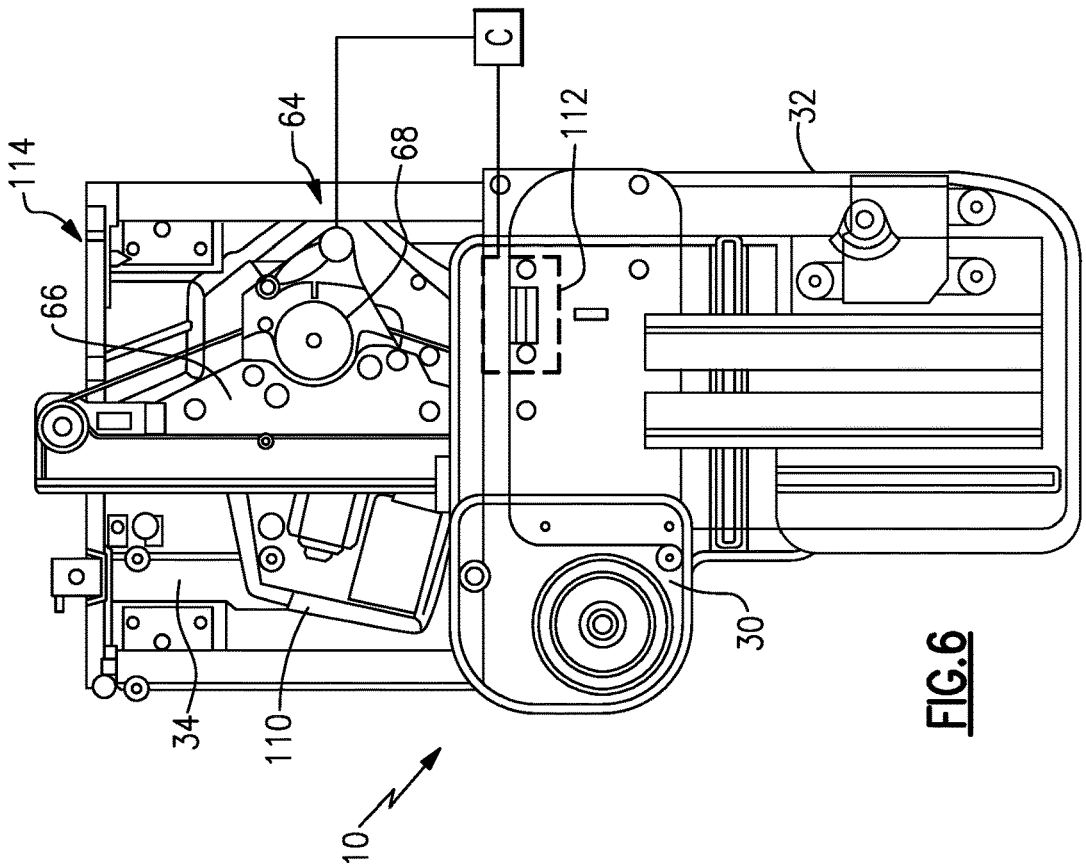

MULTI-POSITIONAL TRAY DEPLOYABLE FROM INSTRUMENT PANEL

TECHNICAL FIELD

This disclosure relates generally to a tray table that can be maneuvered between a plurality of different use positions, and which is retracted within an instrument panel to a stowed position.

BACKGROUND

Vehicles can include stowable trays or tables. In some configurations, the trays or tables are located in seat areas or in consuls located between a driver side seat and a passenger side seat. More compact and versatile configurations may provide for more multi-use purposes for vehicle occupants.

SUMMARY

An apparatus according to an exemplary aspect of the present disclosure includes, among other things, a table that is moveable between a stowed position and a deployed position. The table extends behind an external surface of an instrument panel such that the table is stored within an instrument panel structure when in the stowed position. When in the deployed position, the table is moveable between a plurality of use positions between a driver and a passenger.

In a further non-limiting embodiment of the foregoing apparatus, the table is moveable in a longitudinal direction extending along a length of a vehicle and in a lateral direction extending along a width of the vehicle, and wherein the table is rotatable about a vertical axis extending along a height of the vehicle.

In a further non-limiting embodiment of any of the foregoing apparatus, longitudinal movement of the table, lateral movement of the table, and rotational movement of the table occurs in a common plane.

In a further non-limiting embodiment of any of the foregoing apparatus, the plurality of use positions includes at least an extended position, a rotated position, and a driver centric position, and wherein the table is moved out of the instrument panel structure in the longitudinal direction to the extended position that is forward of the external surface of the instrument panel such that the table can be shared between the passenger and the driver, and wherein the table is rotated about the vertical axis from the extended position to the rotated position, and wherein the table is moved in the lateral direction from the rotated position to the driver centric position.

In a further non-limiting embodiment of any of the foregoing apparatus, the plurality of use positions further includes at least a second extended position where the table is moved in the longitudinal direction from the extended position to the second extended position that is further away from the external surface of the instrument panel than the extended position.

In a further non-limiting embodiment of any of the foregoing apparatus, the table has a flat use surface defined by a length extending in the longitudinal direction and a width extending in the lateral direction and wherein the length is greater than the width.

In a further non-limiting embodiment of any of the foregoing apparatus, the flat use surface faces in an upward direction along the vertical axis when located within the instrument panel structure.

In a further non-limiting embodiment of any of the foregoing apparatus, the external surface of the instrument panel includes a control display and wherein the table is located within the instrument panel structure behind the control display and behind a steering wheel when in the stowed position.

In a further non-limiting embodiment of any of the foregoing apparatus, at least one position sensor is used to determine whether the table is in the stowed position or deployed position, and a lock holds the table in the stowed position such that the table cannot be deployed while a vehicle is moving.

In a further non-limiting embodiment of any of the foregoing apparatus, the table is manually deployed via manual input to a latch, and a housing is fixed to the instrument panel structure and an undermount slider bearing is mounted between the housing and the table to allow the table to be slid out of the housing in a longitudinal direction extending along a length of a vehicle.

In a further non-limiting embodiment of any of the foregoing apparatus, a housing is fixed to the instrument panel structure and a motor is mounted to the housing and configured to move the table out of the housing in a longitudinal direction extending along a length of a vehicle.

An apparatus, according to yet another exemplary aspect of the present disclosure includes, among other things, an instrument panel structure that provides an external surface that includes at least one display and a table that is moveable between a stowed position and a deployed position. The table extends behind the external surface and the at least one display such that the table is stored within the instrument panel structure when in the stowed position. The table is moveable in a longitudinal direction extending along a length of a vehicle and in a lateral direction extending along a width of the vehicle, and wherein the table is rotatable about a vertical axis extending along a height of the vehicle. When in the deployed position, the table is moveable between a plurality of use positions between a driver and a passenger.

In a further non-limiting embodiment of any of the foregoing apparatus, longitudinal movement of the table, lateral movement of the table, and rotational movement of the table occurs in a common plane.

In a further non-limiting embodiment of any of the foregoing apparatus, the plurality of use positions includes at least an extended position, a rotated position, and a driver centric position, and wherein the table is moved out of the instrument panel structure in the longitudinal direction to the extended position that is forward of the external surface such that the table can be shared between the passenger and the driver, wherein the table is rotated about the vertical axis from the extended position to the rotated position, and wherein the table is moved in the lateral direction from the rotated position to the driver centric position.

In a further non-limiting embodiment of any of the foregoing apparatus, the plurality of use positions further includes at least a second extended position where the table is moved in the longitudinal direction from the extended position to the second extended position that is further away from the external surface of the instrument panel structure than the extended position.

In a further non-limiting embodiment of any of the foregoing apparatus, the table has a flat use surface defined by a length extending in the longitudinal direction and a width extending in the lateral direction and wherein the length is greater than the width, and wherein the flat use surface faces in an upward direction along the vertical axis when located within the instrument panel structure.

In a further non-limiting embodiment of any of the foregoing apparatus, at least one position sensor is used to determine whether the table is in the stowed position or deployed position, and a lock holds the table in the stowed position such that the table cannot be deployed while the vehicle is moving.

In a further non-limiting embodiment of any of the foregoing apparatus, a housing is fixed to the instrument panel structure, and the table is manually deployed via manual input to a latch, and an undermount slider bearing is mounted between the housing and the table to allow the table to be slid out of the housing in the longitudinal direction, or a motor is mounted to the housing and configured to move the table out of the housing in the longitudinal direction.

A method according to still another exemplary aspect of the present disclosure includes, among other things: moving a table moveable between a stowed position and a deployed position, wherein the table extends behind an external surface of an instrument panel such that the table is stored within an instrument panel structure when in the stowed position; and when in the deployed position, selectively moving the table between a plurality of use positions between a driver and a passenger.

In a further non-limiting embodiment of the foregoing method, the table is moveable in a longitudinal direction extending along a length of a vehicle and in a lateral direction extending along a width of the vehicle, and wherein the table is rotatable about a vertical axis extending along a height of the vehicle, and wherein the plurality of use positions includes at least an extended position, a rotated position, and a driver centric position, and the method further includes moving the table out of the instrument panel structure in the longitudinal direction to the extended position that is forward of the external surface of the instrument panel such that the table can be shared between the passenger and the driver, rotating the table about the vertical axis from the extended position to the rotated position such that the table is closer to the driver than the passenger, and moving the table in the lateral direction from the rotated position to the driver centric position, and wherein longitudinal movement of the table, lateral movement of the table, and rotational movement of the table occurs in a common plane.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1A illustrates a tray table that is in a stowed position.

FIG. 1B illustrates the tray table in a deployed position.

FIG. 1C illustrates the tray table in an extended position to share between a driver and a passenger.

FIG. 1D illustrates the tray table in a rotated position toward the driver.

FIG. 1E illustrates the tray table in a driver centric position.

FIG. 6 shows unique features to the powered table configuration.

FIG. 7 shows unique features to the manual table configuration.

DETAILED DESCRIPTION

Figure 2A:
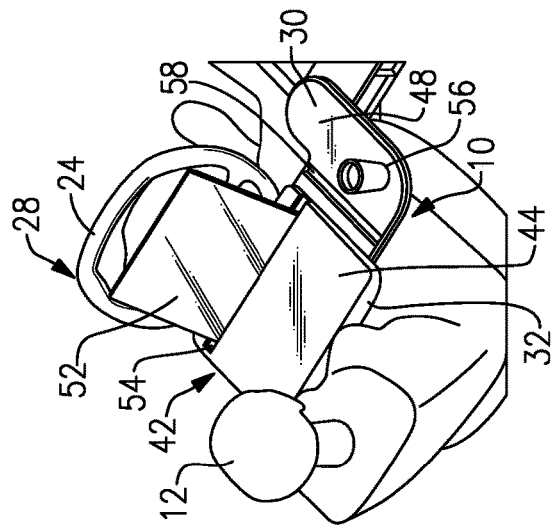
FIG. 2A illustrates the tray table in the driver centric position with a larger size laptop and mouse.

This disclosure details an exemplary a tray table that can be maneuvered between a plurality of different use positions, and which is retracted within an instrument panel to a stowed position.

With reference to FIGS. 1A-1E, a multi-positional tray table assembly 10 for use by a driver 12 and/or a passenger 14 is deployed from a center of an instrument panel 16. The table assembly 10 is stowed in a retracted position that extends behind an external surface 18 of the instrument panel 16 such that the table assembly 10 is stored within in internal cavity 20 in an instrument panel housing structure 22 when in the stowed position.

A steering wheel 24 extends outwardly of the instrument panel 16 and is moveable between a use position 26 and a retracted/stowed position 28 as shown in FIG. 1A. When in the retracted position 28, the steering wheel 24 is moved closer to the instrument panel 16 to increase the available space for the table assembly 10. The table assembly 10 is powered or manually operated and extends behind the external surface 18 of the instrument panel 16 when in the stowed position. When in the stowed position the table assembly 10 is positioned in a further forward location toward a front of the vehicle than the steering wheel 24. When the vehicle is parked, the steering wheel 24 can be moved to the retracted position 28 as shown in FIGS. 1A-E and the table assembly can be deployed from the stowed position (FIG. 1A) to the multi-use positions shown in FIGS. 1B-1E.

The table assembly 10 includes a swing arm 30 coupled to a table 32 that extends outwardly of a housing 34 fixed to the instrument panel housing structure 22. The table 32 is moveable in a longitudinal direction D1 (FIG. 1B) extending along a length of a vehicle and in a lateral direction D2 (FIG. 1E) extending along a width of the vehicle. The table is also rotatable R about a vertical axis V extending along a height of the vehicle as shown in FIG. 1D. In one example, longitudinal movement of the table 32, lateral movement of the table 32, and rotational movement of the table occurs in a common plane P (FIGS. 1D-E).

The plurality of use positions includes at least an extended position 36 where the table 32 is slid in the longitudinal direction D1 from the stowed position to a position that is outward of the retracted steering wheel 24 as shown in FIG. 1B. In this position, the table 32 can be used by the driver 12 or passenger 14. The plurality of use positions further includes at least a second extended position 38 where the table 32 is moved in the longitudinal direction D1 from the first extended position 36 to the second extended position 38 that is further away from the instrument panel 16 than the first extended position 36. In this second extended position 38, the table 32 can more easily be shared between the driver 12 and passenger 14. The plurality of use positions further includes a rotated position 40 where the table 32 is rotated about the vertical axis V from the shared second extended position 38 to the rotated position 40. In this position, the table 32 extends at least partially in front of the driver 12 for a driver use position that does not fully block the driver from accessing other portions of the instrument panel 16. The plurality of use positions further includes a driver center use position 42 where the table 32 is slid in the lateral direction D2 from the rotated position 40 to the driver center use position 42. In this position, the table 32 is positioned fully in front of the driver 12. Thus, the table 32 moves in three degrees of freedom and has at least five different use positions to support various customer configurations.

Figure 2B:
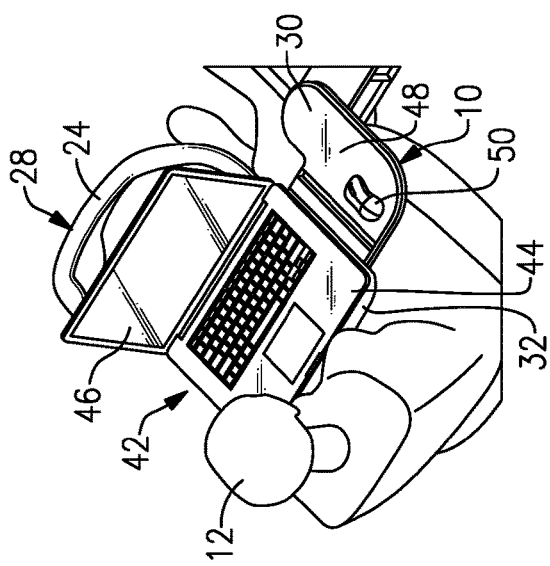
FIG. 2B illustrates the tray table in the driver centric position with a tablet and a cup.
Figure 2C:
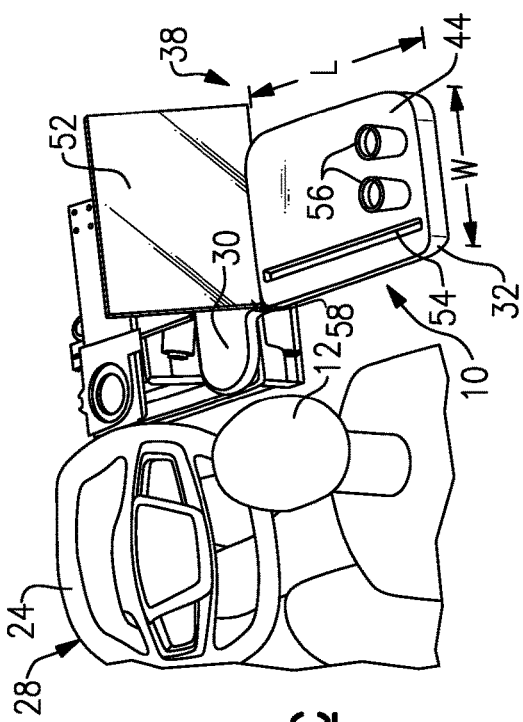
FIG. 2C illustrates the tray table in a shared position with a tablet and cups for both the driver and passenger.

As shown in FIGS. 2A-C, the table 32 has a flat use surface 44 defined by a length L extending in the longitudinal direction D1 and a width W extending in the lateral direction D2. In one example, the length L is greater than the width W. FIG. 2A shows the driver center use position 42 where the flat use surface 44 is large enough to support a fifteen inch laptop 46, and with the swim arm 30 providing a flat use surface 48 that can support a mouse 50.

FIG. 2B shows the driver center use position 42 where the flat use surface 44 is large enough to support a large tablet 52 that has a bottom edge that fits within a slot 54 formed in the flat use surface 48 of the table 32 and a top edge that rests against the steering wheel 24 that is in the retracted position 28. The slot 54 is open to the edge of the flat use surface 44 to allow for different size tablets 52 and to allow for improved cleanability of the slot and for fluid drainage. The flat use surface 48 of the swim arm 30 can support a cup 56 or other items as needed.

FIG. 2C shows the shared second extended position 38 where the tablet 52 is held in a mount position in a slot 58 (best seen in FIG. 2B) formed in the swing arm 30 next to a forward edge of the table 32. The slot 58 is open to the edge of the flat use surface 48 to allow for different size tablets 52 and to allow for improved cleanability of the slot and for fluid drainage. The flat use surface 44 is then available to support cups 56 for the driver 12 and passenger 14 or other items as needed.

Figure 3A:
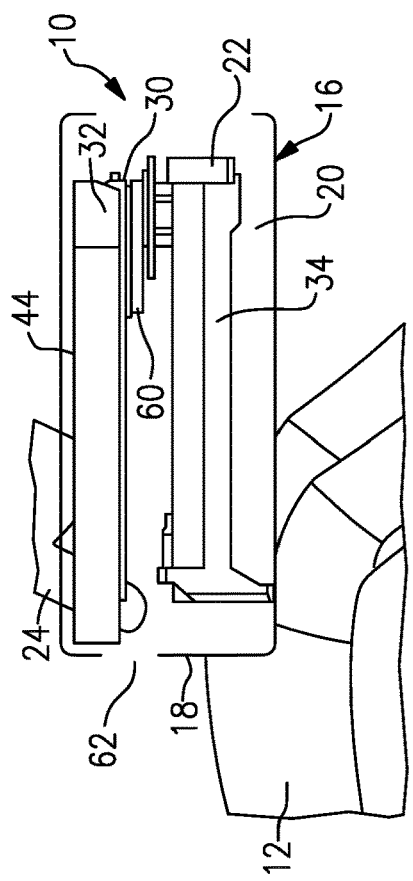
FIG. 3A shows a side view of a manually operated tray table in the stowed position and FIG. 3B shows a powered table assembly with the tray table being in an extended position.

The flat use surface 44 faces in an upward direction along the vertical axis V when the table 32 located within the instrument panel structure 22 in the stowed position as shown in FIG. 3A. FIG. 3A shows a manually controlled table assembly 10 that includes the table 32, a gantry 60, the swing arm 30, and the housing 34 that is mounted to the instrument panel housing structure 22 within the instrument panel 16. The housing 34 provides support for the table 32 and the gantry 60 and swing arm 30 are associated with the table 32 to allow the table 32 to be moved out of the housing 34 and to be moved between the plurality of use positions. When being deployed to a use position from the stowed position, the table 32 exits the instrument panel 16 via a slot 62 open to the external surface 18 of the instrument panel 16. In one example, the slot 62 is in a center location of the instrument panel between the passenger and the driver.

Figure 3B:
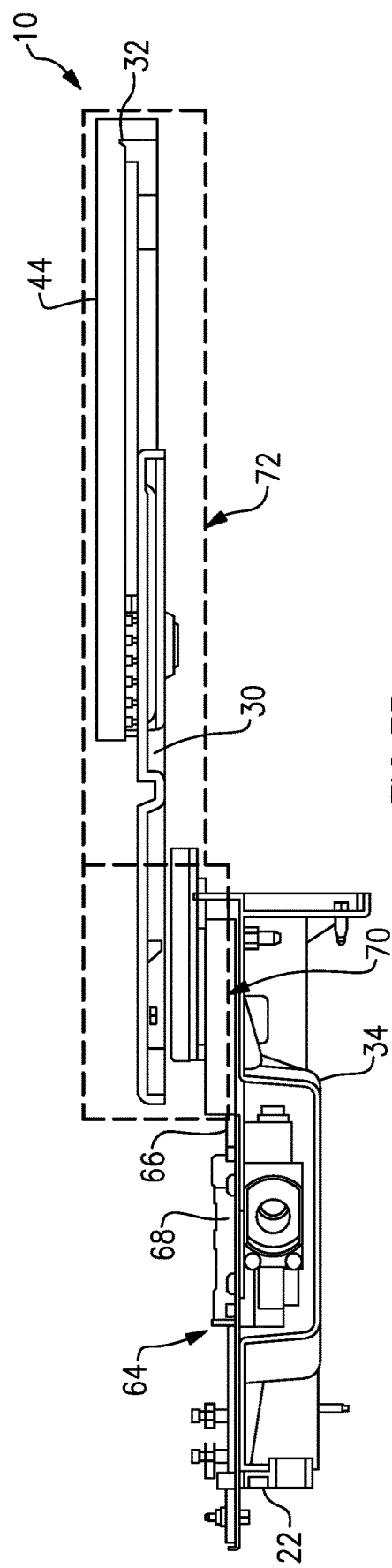

FIG. 3B shows a powered table assembly 10 with the table 32 being in the second extended position 38. The table assembly 10 includes the table 32, a power source 64, the swing arm 30, and the housing 34 that is mounted to the instrument panel housing structure 22 within the instrument panel 16. The housing 34 provides support for the table 32 and the power source 64 and swing arm 30 are coupled to the table 32 to allow the table 32 to be moved out of the housing 34 and to be moved between the plurality of use positions. In one example, the power source 64 comprises a window regulator mechanism 66 and motor 68. A first portion 70 is attached to the regulator mechanism 66 to carry the entire table 32 and swing arm 30 assembly. A second portion 72 is deployed to the extended position similar to a side window being moved from an open position to a closed position in a door frame.

Figure 4:
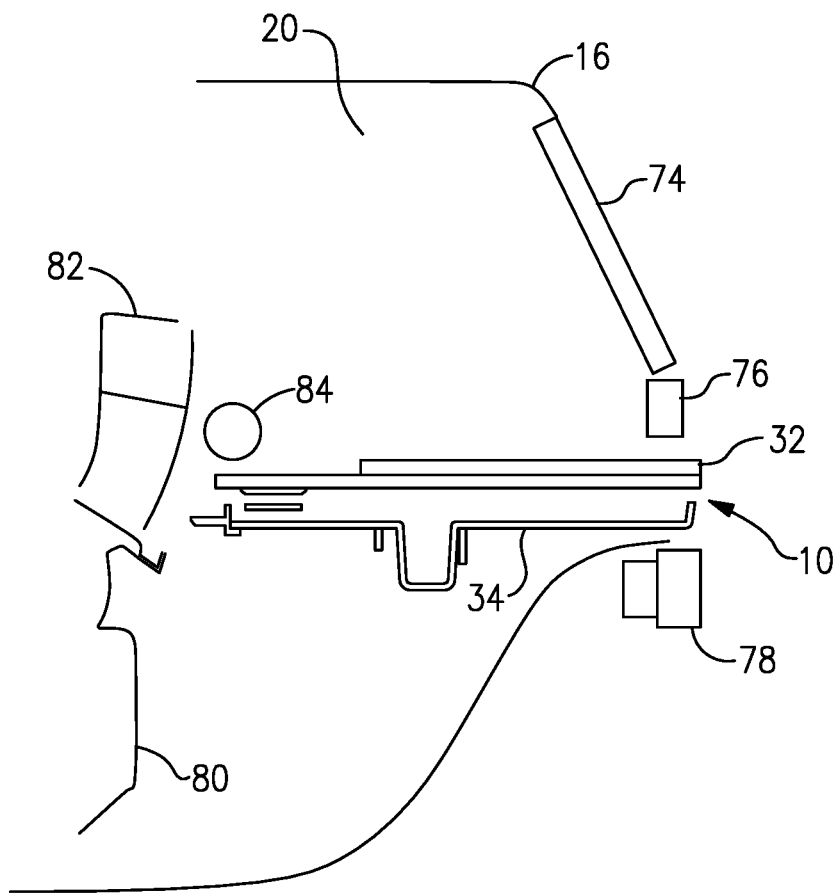
FIG. 4 is a schematic side view representation of the position of the tray table relative to internal instrument panel components and other vehicle components when the tray table is in the stowed position.

As shown in FIG. 4, in one example, the external surface 18 of the instrument panel 16 includes a control display 74 and a set of panel switches 76 that are used for climate control, for example. When in the stowed position, the table 32 is located within the internal cavity 20 of the instrument panel 16 behind the control display 74 and at a more vehicle forward position than the steering wheel 24 and a shifter 78. Other components are also located within the internal cavity of the instrument panel 16, such as HVAC (heating-ventilation-air conditioning) components 80, ducts 82, support beams 84, etc. The table assembly 10 is packaged within the internal cavity 20 to avoid interference with these other internal components. The table assembly 10 is configured to have a very compact in size such that it does not take up a significant amount of space within the instrument panel structure 22.

Figure 5B:
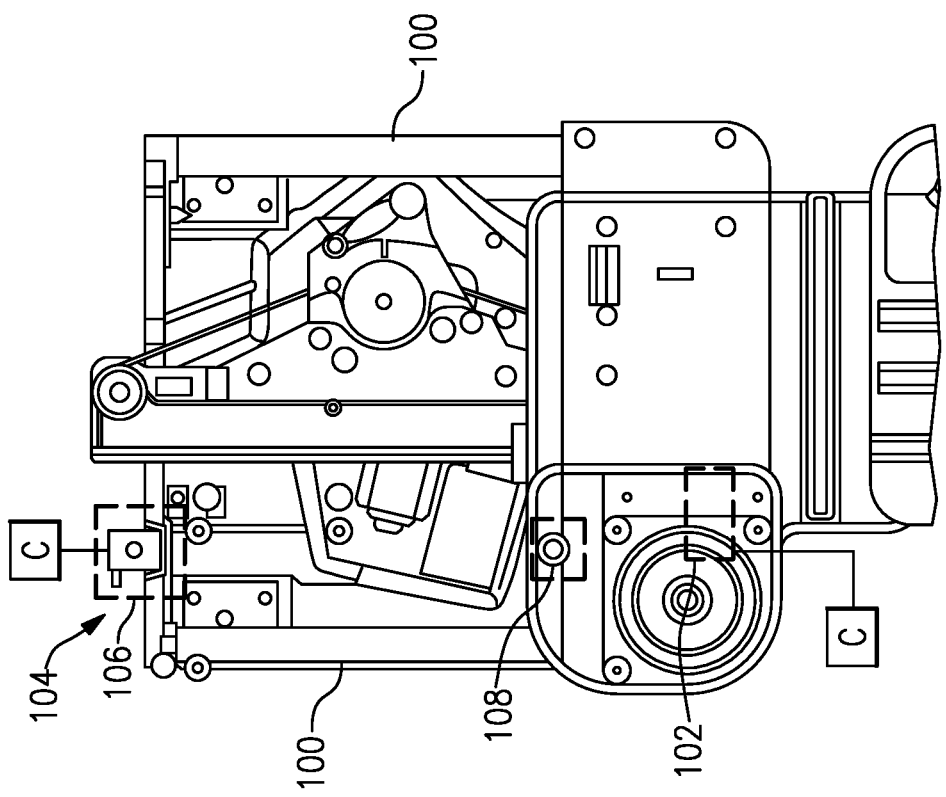
FIG. 5B shows a second set of features/components that are common for powered and manual table configurations.
Figure 5A:
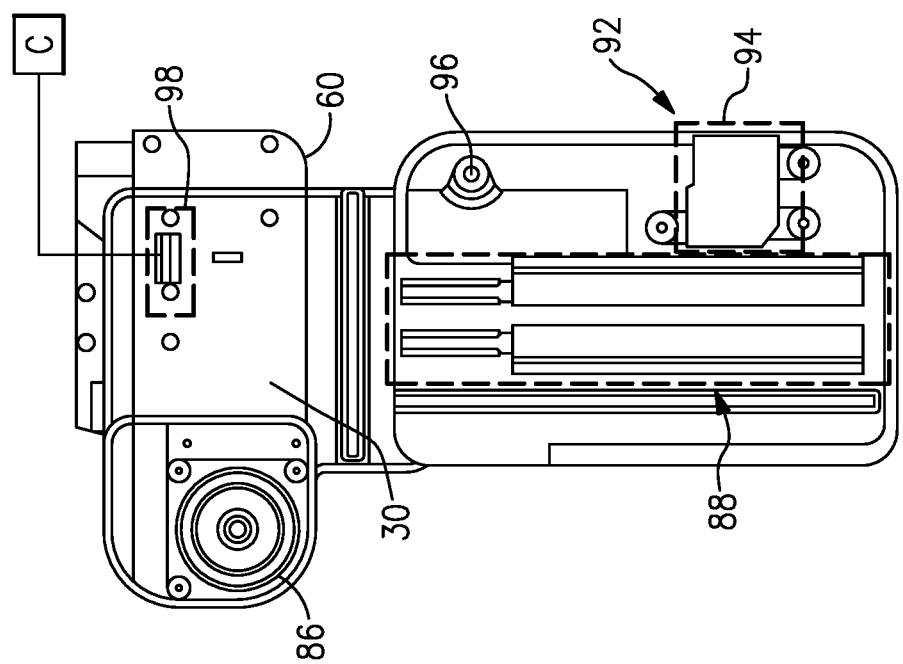
FIG. 5A shows a first set of features/components that are common for powered and manual table configurations.

FIGS. 5A and 5B show common features and components for the manually operated and powered configurations. Each configuration includes a bearing 86 that provides for the rotating of the swing arm 30. In one example, the bearing 86 is loaded between two plates to provide an arm rotation hinge that provides for rotation up to ninety degrees. In one example, the bearing 86 comprises a high strength steel ball bearing loaded hinge that provides for a smooth swing of the arm 30.

Figure 8:
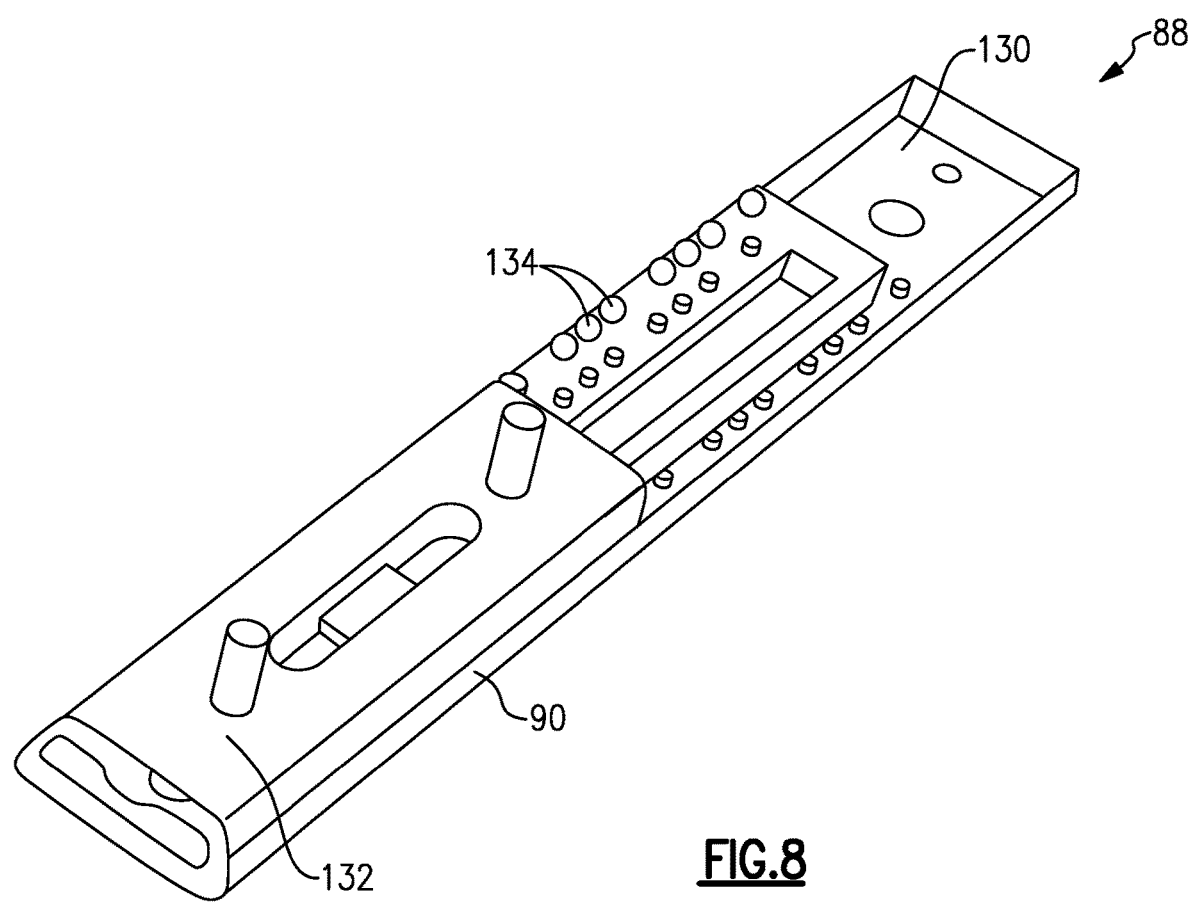
FIG. 8 shows a linear bearing slide that can be used for the powered and manual table configurations.

Each configuration also includes a table slider assembly 88 that allows the table 32 to be moved back in forth in a linear direction. In one example, the table slider assembly 88 comprises a linear bearing slide 90 as shown in FIG. 8. In the example shown in FIG. 5A, the table 32 includes two linear bearing slides 90 to provide for a stable support base.

In one example shown in FIG. 8, the linear bearing slide 90 includes a bearing housing 130, a slider 132, and a plurality of bearing elements 134 to allow the slider 132 to move smoothly relative to the bearing housing 130. The bearing housing 130 has one end mounted within the table 32 and another end associated with the swing arm 30. The slider 132 includes detents to define stop positions for the table 32.

Each configuration also includes a latching mechanism 92 to latch the table 32 to the swing arm 30. In one example, the latching mechanism 92 includes a table lock latch 94 mounted with a handle on a side of the table 32 and a table lock striker 96 mounted on the swing arm 30. When the table 32 is slid back to the stowed position, the striker 96 is captured by the latch 94 such that the table 32 is locked in place. The gantry 60 provides support for the swing arm 30 as the arm moves linearly in an out of the housing 34. A sensor 98 is used to determine whether or not the table 32 is in the stowed position. In one example, the sensor 98 is an optical sensor that is located within an opening in the swing arm 30 and is in communication with a system controller C. The controller C can be a dedicated controller or can be part of a controller for another vehicle sub-system, and can include a processor, memory, and one or more input and/or output (I/O) device interface(s) that are communicatively coupled via a local interface. If the sensor 98 senses that the table 32 is in the locked position, the driver will be able to drive the vehicle. If the table 32 is not properly stowed and latched, the driver will not be able to drive the vehicle.

Each configuration also includes one or more load bearing tubes 100. In the example shown in FIG. 5B, two tubes 100 are utilized, one on each side of the assembly. The tubes 100 increase rigidity and provide for a stable support base. In one example, the load bearing tubes 100 are made from a stainless steel material. In one example, the gantry 60 is configured to evenly distribute the load to each tube 100.

Each configuration also includes a load sensor 102 that is in communication with the system controller C. The load sensor 102 generates a signal when a load on the table assembly 10 exceeds a maximum allowable load. In one example, the load sensor 102 comprises a metal proximity type, which senses displacement.

Each configuration also includes a lock mechanism 104 that is used to lock the swing arm 30 to the gantry 60. In one example, the lock mechanism 104 comprises a solenoid 106 held fixed to the gantry 60 and that extends to fit within an opening 108 in the swing arm 30. The solenoid 106 is controlled via the system controller C. In one example, the controller C only unlocks the lock mechanism 104 when the vehicle is stationary and in park.

FIG. 6 shows an example of features that are associated with the powered table assembly 10. In this example, the power source 64 comprises the window regulator mechanism 66 and motor 68 which are positioned within a power base housing 110. The power source 64 is mounted within the housing 34 that is fixed to the instrument panel structure 22. In one example, a sensor 112 is used to monitor a position of the table 32. The sensor 112 communicates with the controller C, and the controller C generates control signals that a communicated to the motor 68 to move the table 32 out of the housing 34 in the longitudinal direction to the deployed position. In one example, the motor has an open/close position detection target deployment time of no more than five seconds. A power back cover 114 at least partially encloses an end of the housing 34.

FIG. 7 shows an example of features that are associated with the manually actuated table assembly 10. In this example, an undermount slider bearing 116 is mounted between the housing 34 and the table 32 to allow the table 32 to be slid out of the housing in the longitudinal direction to the deployed position. In one example, the slider bearing 116 is positioned centrally between the tubes 100 to provide for a stable configuration. The manual configuration also includes a latch 118 that cooperates between the swing arm 30 and the table 32. The latch 118 locks the table to the swing arm 30 in the extended position. The latch 118 can be manually actuated/released to allow the table 32 to be rotated to the rotated position. The table assembly 10 also includes an opening latch 120 that is pushed to allow the table to be moved from the stowed position to the deployed position. Another latch 122 is used to secure the table assembly 10 within the housing 34. In one example, the latch 122 comprises a stow/hold pull type latch. A sensor 124 is used to monitor a position of the table 32. The sensor 112 communicates with the controller C to identify whether or not the table is positioned within the housing 34 before the vehicle can be driven. A manual back cover 126 at least partially encloses an end of the housing 34.

The subject disclosure provides a robust and durable tray table assembly 10 that can be maneuvered between a plurality of different use positions, and which is retracted within a center stack section of an instrument panel 16 to a stowed position. The table assembly 10 has a compact configuration such that it does not occupy a significant amount of packaging space within the instrument panel structure. The tray table assembly 10 can be utilized by both the driver and passenger and moves in three degrees of freedom and between five different use positions to support the various desired customer configurations. The tray assembly 10 provides a table surface that is large enough to support a laptop and a large tablet, and provides for manually operated and powered configurations.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
    a table moveable between a stowed position and a deployed position, wherein the table extends behind an external surface of an instrument panel such that the table is stored within an instrument panel structure when in the stowed position, and wherein the external surface of the instrument panel includes a control display and an open slot beneath the control display, and wherein the table extends outwardly from the open slot when in the deployed position, and wherein the table is located within the instrument panel structure to enter the open slot and extend behind the control display when in the stowed position; and
    wherein, when in the deployed position, the table is moveable between a plurality of use positions between a driver and a passenger, wherein
    the table is moveable into and out of the open slot in a longitudinal direction extending along a length of a vehicle when moving between the stowed and the deployed positions,
    the table is rotatable about a vertical axis extending along a height of the vehicle to a rotated position once the table is deployed out of the open slot, and
    subsequent to rotation, the table is moveable in a lateral direction extending along a width of the vehicle between passenger and driver use positions.

2. The apparatus according to claim 1, wherein longitudinal movement of the table, lateral movement of the table, and rotational movement of the table occurs in a common plane.

3. The apparatus according to claim 1, wherein the plurality of use positions includes at least an extended position, a rotated position, and a driver centric position, and wherein the table is moved out of the instrument panel structure in the longitudinal direction to the extended position that is forward of the external surface of the instrument panel such that the table can be shared between the passenger and the driver, and wherein the table is rotated about the vertical axis from the extended position to the rotated position, and wherein the table is moved in the lateral direction from the rotated position to the driver centric position.

4. The apparatus according to claim 3, wherein the plurality of use positions further includes at least a second extended position where the table is moved in the longitudinal direction from the extended position to the second extended position that is further away from the external surface of the instrument panel than the extended position.

5. The apparatus according to claim 1, wherein the table has a flat use surface defined by a length extending in the longitudinal direction and a width extending in the lateral direction and wherein the length is greater than the width.

6. The apparatus according to claim 5, wherein the flat use surface faces in an upward direction along the vertical axis when located within the instrument panel structure.

7. The apparatus according to claim 1, wherein the table is at a more forward location in a vehicle than a steering wheel when in the stowed position.

8. The apparatus according to claim 1, including at least one position sensor that is used to determine whether the table is in the stowed position or deployed position, and including a lock that holds the table in the stowed position such that the table cannot be deployed while a vehicle is moving.

9. The apparatus according to claim 1, wherein the table is manually deployed via manual input to a latch, and including a housing fixed to the instrument panel structure and an undermount slider bearing mounted between the housing and the table to allow the table to be slid out of the housing in a longitudinal direction extending along a length of a vehicle.

10. The apparatus according to claim 1, including a housing fixed to the instrument panel structure and a motor mounted to the housing and configured to move the table out of the housing in a longitudinal direction extending along a length of a vehicle.

11. An apparatus, comprising:
an instrument panel structure providing an external surface that includes at least one control display;
a table moveable between a stowed position and a deployed position, wherein the table extends behind the external surface and the at least one control display such that the table is stored within the instrument panel structure when in the stowed position, and wherein the external surface of the instrument panel includes an open slot beneath the control display, and wherein the table extends outwardly from the open slot when in the deployed position, and wherein the table is located within the instrument panel structure to enter the open slot and extend behind the control display when in the stowed position;
wherein the table is moveable in a longitudinal direction extending along a length of a vehicle and in a lateral direction extending along a width of the vehicle, and wherein the table is rotatable about a vertical axis extending along a height of the vehicle; and
wherein, when in the deployed position, the table is moveable between a plurality of use positions between a driver and a passenger, wherein
the table is moveable into and out of the open slot in the longitudinal direction when moving between the stowed and the deployed positions,
the table is rotatable about the vertical axis to a rotated position once the table has moved out of the open slot, and
the table is then moveable in the lateral direction between passenger and driver use positions.

12. The apparatus according to claim 11, wherein longitudinal movement of the table, lateral movement of the table, and rotational movement of the table occurs in a common plane.

13. The apparatus according to claim 11, wherein the plurality of use positions includes at least an extended position, the rotated position, and a driver centric position, and wherein the table is moved out of the open slot of the instrument panel structure in the longitudinal direction to the extended position that is forward of the external surface such that the table can be shared between the passenger and the driver, wherein the table is rotated about the vertical axis from the extended position to the rotated position, and wherein the table is moved in the lateral direction from the rotated position to the driver centric position.

14. The apparatus according to claim 13, wherein the plurality of use positions further includes at least a second extended position where the table is moved in the longitudinal direction from the extended position to the second extended position that is further away from the external surface of the instrument panel structure than the extended position.

15. The apparatus according to claim 11, wherein the table has a flat use surface defined by a length extending in the longitudinal direction and a width extending in the lateral direction and wherein the length is greater than the width, and wherein the flat use surface faces in an upward direction along the vertical axis when located within the instrument panel structure.

16. The apparatus according to claim 11, including at least one position sensor that is used to determine whether the table is in the stowed position or deployed position, and including a lock that holds the table in the stowed position such that the table cannot be deployed while the vehicle is moving.

17. The apparatus according to claim 11, including a housing fixed to the instrument panel structure, and
wherein the table is manually deployed via manual input to a latch, and including an undermount slider bearing mounted between the housing and the table to allow the table to be slid out of the housing in the longitudinal direction, or
including a motor mounted to the housing and configured to move the table out of the housing in the longitudinal direction.

18. A method comprising:
moving a table moveable between a stowed position and a deployed position, wherein the table extends behind an external surface of an instrument panel such that the table is stored within an instrument panel structure when in the stowed position, and wherein the external surface of the instrument panel includes a control display and an open slot beneath the control display, and wherein the table extends outwardly from the open slot when in the deployed position, and wherein the table is located within the instrument panel structure to enter the open slot and extend behind the control display when in the stowed position; and when in the deployed position, selectively moving the table between a plurality of use positions between a driver and a passenger, the method including moving the table into and out of the open slot in a longitudinal direction extending along a length of a vehicle when moving between the stowed and the deployed positions, after moving out of the open slot, rotating the table about a vertical axis extending along a height of the vehicle to a rotated position, and once in the rotated position, moving the table in a lateral direction extending along a width of the vehicle between passenger and driver use positions.

19. The method according to claim 18, wherein the plurality of use positions includes at least an extended position, the rotated position, and a driver centric position, and including moving the table out of the open slot of the instrument panel structure in the longitudinal direction to the extended position that is forward of the external surface of the instrument panel such that the table can be shared between the passenger and the driver, rotating the table about the vertical axis from the extended position to the rotated position such that the table is closer to the driver than the passenger, and moving the table in the lateral direction from the rotated position to the driver centric position, and wherein longitudinal movement of the table, lateral movement of the table, and rotational movement of the table occurs in a common plane.

20. The method according to claim 18, wherein the table has a flat use surface defined by a length extending in the longitudinal direction and a width extending in the lateral direction, and including having the flat use surface facing in an upward direction along the vertical axis when located within the instrument panel structure in the stowed position.

21. The method according to claim 18, wherein the open slot is centrally located within the instrument panel between the driver and the passenger, and further including, when moving from the stowed position to the deployed position:

first moving the table axially in the longitudinal direction out of the instrument panel to an extended position, and then rotating the table about the vertical axis to be deployed to a driver centric position.

22. The method according to claim 18, including determining whether the table is in the stowed position or deployed position using at least one position sensor, and including locking the table in the stowed position such that the table cannot be deployed out of the stowed position while the vehicle is moving.

23. The apparatus according to claim 1, wherein the open slot is centrally located within the instrument panel between the driver and the passenger.

24. The apparatus according to claim 1, wherein, when moving from the stowed position to the deployed position, the table first moves axially in the longitudinal direction out of the instrument panel to an extended position and is then rotated about the vertical axis to be deployed to a driver centric position, and wherein the table includes a flat use surface that faces in an upward direction along the vertical axis, and wherein the flat use surface includes at least one slot configured to selectively support a user device.

* * * * *